(No Model.) 2 Sheets—Sheet 1.
M. P. SIMPSON, E. P. WILLIAMS & J. M. SIMPSON.
DISK PLANTER.
No. 605,755. Patented June 14, 1898.
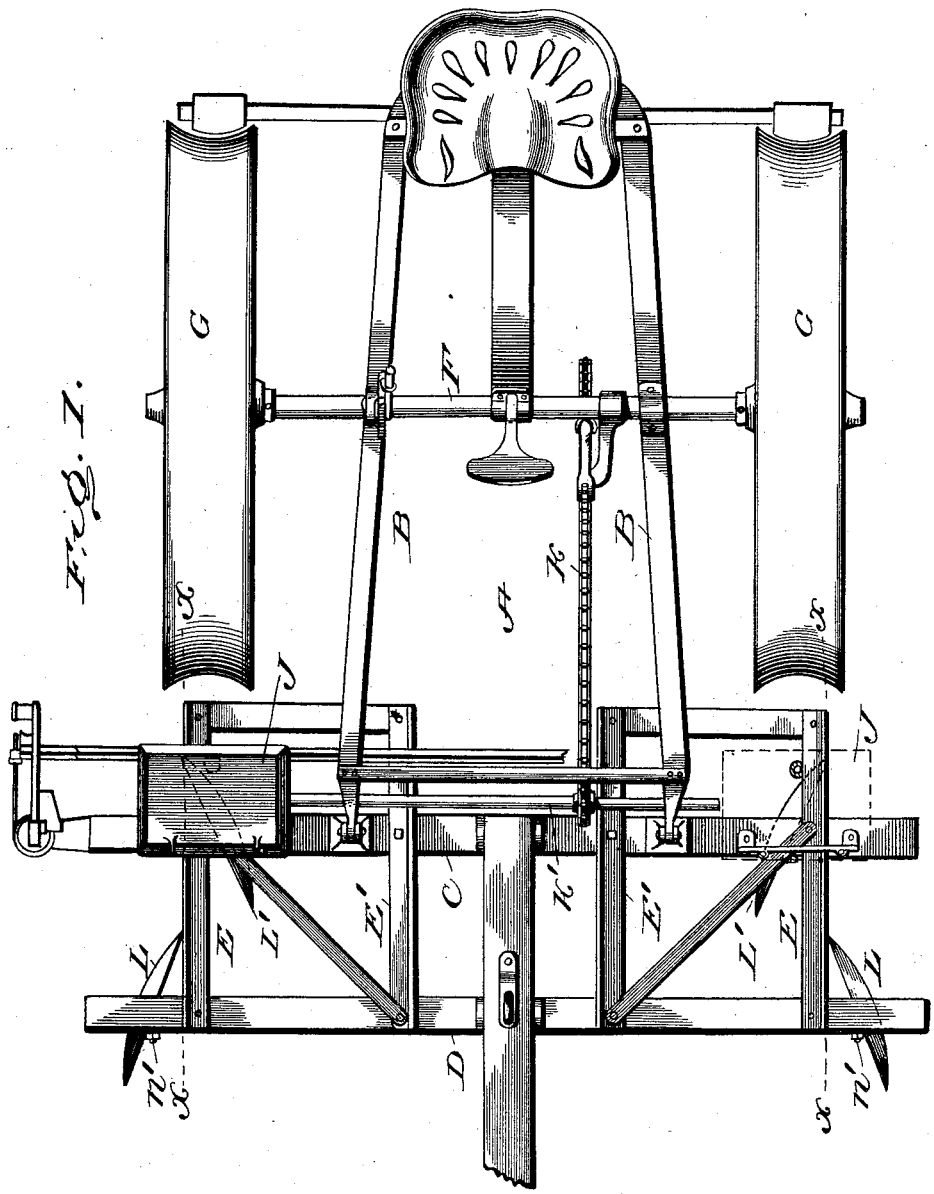
Witnesses:
Inventors
Matthew P. Simpson
Eli P. Williams
James M. Simpson
By R. S. & A. B. Lacey, their Attorneys.

(No Model.) 2 Sheets—Sheet 2.
M. P. SIMPSON, E. P. WILLIAMS & J. M. SIMPSON.
DISK PLANTER.
No. 605,755. Patented June 14, 1898.
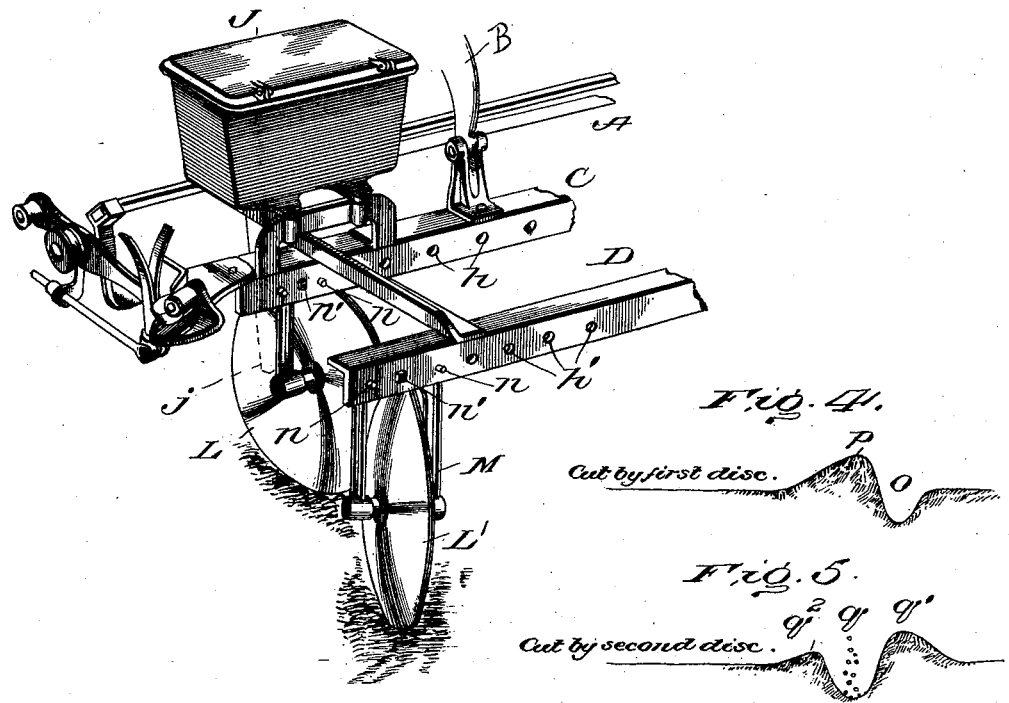
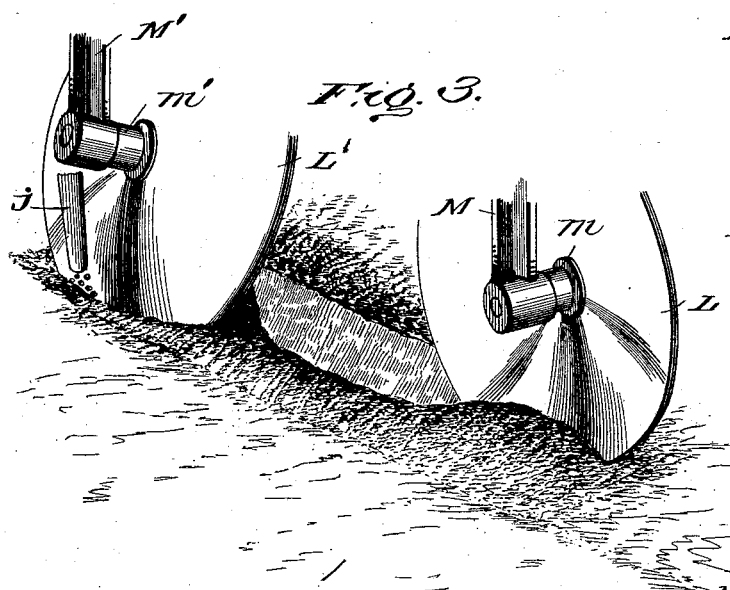

UNITED STATES PATENT OFFICE.

MATTHEW P. SIMPSON, ELI P. WILLIAMS, AND JAMES M. SIMPSON, OF McPHERSON, KANSAS.

DISK PLANTER.

SPECIFICATION forming part of Letters Patent No. 605,755, dated June 14, 1898.

Application filed January 14, 1898. Serial No. 666,685. (No model.)

*To all whom it may concern:*

Be it known that we, MATTHEW P. SIMPSON, ELI P. WILLIAMS, and JAMES M. SIMPSON, citizens of the United States, residing at McPherson, in the county of McPherson and State of Kansas, have invented certain new and useful Improvements in Disk Planters; and we do hereby declare the following to be a full, clear, and exact description of the invention, such as will enable others skilled in the art to which it appertains to make and use the same.

Our invention relates to improvements in disk planters; and its object is to provide a novel construction and arrangement of the furrow-cutting disks, seed-grain spouts, and presser-wheels to plant the seed in the most effective and advantageous manner.

With this and other objects in view the invention consists in certain novel features of construction and combination of parts, as will be hereinafter more fully described and claimed.

In the accompanying drawings, forming a part of this specification, Figure 1 represents a top plan view of a planter embodying our invention. Fig. 2 is a perspective view of a portion of one end of the frame, showing the arrangement of the furrow-cutting disks. Fig. 3 is a perspective view of the disks, looking toward the inner sides thereof, showing the manner of forming the seed-receiving furrow and dropping the seed thereinto. Fig. 4 is a sectional view showing the furrow cut by the front disk. Fig. 5 is a similar view showing the furrow cut by the rear disk, and Fig. 6 is also a sectional view showing the seed as covered by the dirt falling back and pressed down by the presser-wheels.

Referring now more particularly to the said drawings, A represents the main frame of the machine, consisting of the longitudinal bars B, transverse bars or beams C D, and parallel longitudinal connecting-bars E E', which are preferably formed of angle-iron, as shown.

F represents the axle, having bearing in the said bars B, and G the presser-wheels, mounted thereon and having concavo-convex rims, the concave faces of which are turned outwardly to form the tread portions in the usual manner. The said transverse beams C D are formed in their vertical web portions, at each end thereof, with a series of orifices $h\ h'$.

J represents the seed-hoppers, which are mounted on the beam C immediately in front of and in line with the presser-wheels, and $j$ are the delivery-spouts leading therefrom. The discharge of seed from these hoppers is regulated by suitable valves operated from the axle by a chain $k$ and shaft $k'$. This valve mechanism is constructed in the usual manner and forms no part of our present invention.

L L' represent the front and rear disks, which are mounted on shafts $m\ m'$, journaled in the arms of inverted-U-shaped bearing-brackets M M'. Two sets of these disks and brackets are employed—one at each side of the frame—and a description of one set will therefore suffice for both. These brackets are provided with locking-pins $n$, which engage the orifices $h\ h'$ in the beams C D and are detachably secured to said beams by bolts $n'$.

The front and rear disks are mounted on the frame in front of the seed-delivery spout $j$, the rear disk being arranged on the inside and the front disk on the outside of a longitudinal line $x\ x$ drawn through the frame and which is in the present instance coincident with the outer face of the connecting-bar E. The concaved side of the front disk faces inwardly and the concaved face of the rear disk outwardly, and the presser-wheel is arranged immediately in rear of said disks, as shown.

The mode of operation of these parts is clearly illustrated in Figs. 3 to 6, inclusive, to which reference is now to be had. The front disk L cuts an initial furrow $o$ and throws the loose soil inwardly to form a ridge $p$. The rear disk L' cuts longitudinally substantially on a central line through this ridge and forms a second or seed-receiving furrow $q$. The earth thrown back by the rear disk closes the furrow $o$ and forms a loose ridge of earth $q'$ at one side of the furrow $q$, while a smaller ridge of loose soil $q^2$ is left standing at the opposite side of the said furrow $q$, as shown in Fig. 5. The seed-spout $j$ is arranged immediately in rear of the center of disk L, on the convex side thereof, and discharges the seed into the furrow $q$, and this seed is covered by the falling back of the loose-earth ridges $q'$ $q^2$ into said furrow. The presser-wheel following then packs the earth down into and closes the furrow $q$, leaving the row level with the general surface of the ground, as shown in Fig. 6. By this construction and arrangement of the disks clods, weeds, dry surface soil, and trash are thrown to the right and left by the two disks entirely off the row, and all the earth loosened and pulverized thereby is retained in the row to form a soft bed for the reception of the seed. The seed is also effectually covered by the falling back of the loose moist earth and by the presser-wheel, which presses the earth firmly down upon the seed and levels the row.

By means of the adjustable connections of the disks said disks may be moved laterally toward or from each other to vary the character of the work according to the requirements incident to the nature and condition of the soil. The position of the front disk L may also be changed independently of the rear disk for level cultivation and so that said rear disk will catch and throw back a greater or less portion of the earth thrown out by the front disk.

From the above description, taken in connection with the accompanying drawings, the construction and operation of our improved disk planter will be readily understood, and it will be seen that provision is made for planting the seed in the most effective and advantageous manner.

Having thus fully described our invention, what we claim as new and useful, and desire to secure by Letters Patent, is—

1. In a disk planter, the combination of two disks arranged in different longitudinal planes one behind the other, said front disk being adjustable laterally toward and from the rear disk, and a seed-delivery device or spout arranged to discharge behind or on the convex side of said rear disk, substantially as described.

2. In a disk planter, the combination of two disks arranged in different longitudinal planes one behind the other, and adjustable laterally toward or from each other, a seed-delivery device or spout arranged to discharge behind or on the convex side of said rear disk, and a presser-wheel arranged to follow directly behind the disks, substantially as described.

3. In a disk planter, the combination, with the front and rear disks arranged in different longitudinal planes, of a seed-delivery device or spout arranged behind or on the convex side of said rear disk, whereby the furrow formed by the front disk will be covered by the earth thrown back by the rear disk and the seed deposited in the furrow formed in a loose ridge of earth by said rear disk, substantially as described.

In testimony whereof we affix our signatures in presence of two witnesses.

MATTHEW P. SIMPSON.
ELI P. WILLIAMS.
JAMES M. SIMPSON.

Witnesses:
W. L. McGIFFERT,
M. S. BINNY.